April 25, 1967   F. F. MAYTONE   3,316,519
WATER COOLED AND LUBRICATED ELECTRICAL SLIP RINGS
Filed Nov. 12, 1963
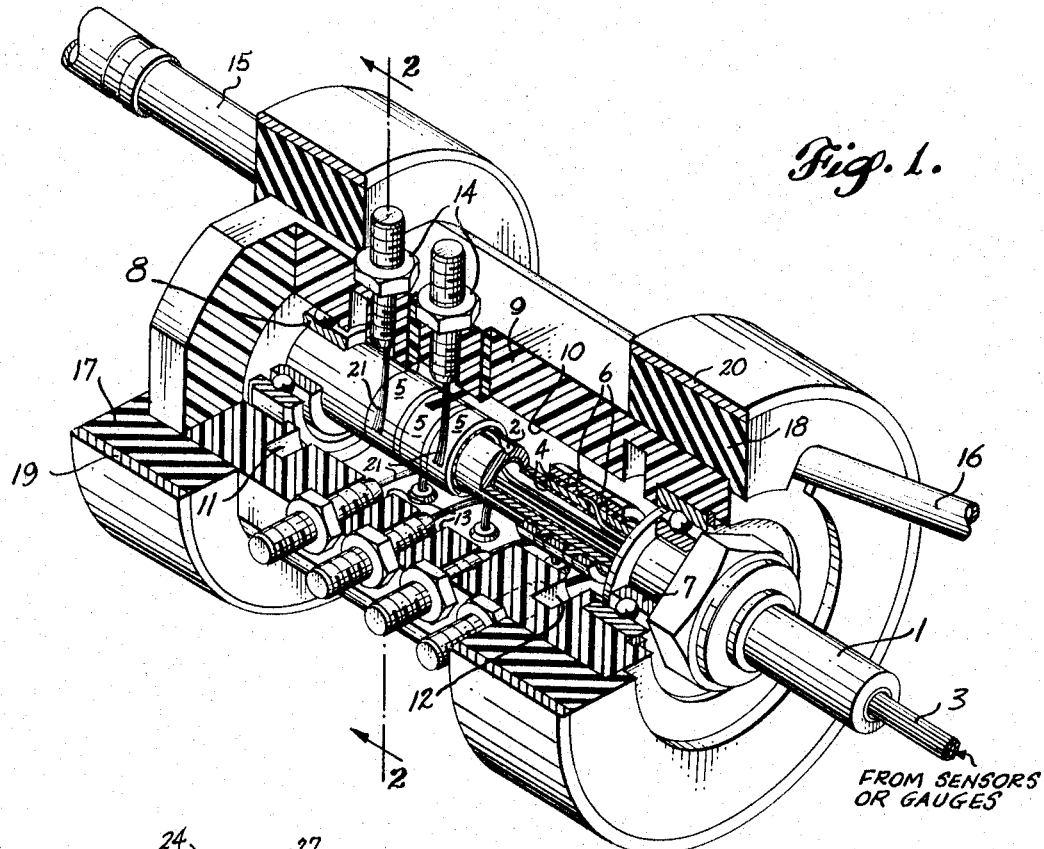
Fig. 1.
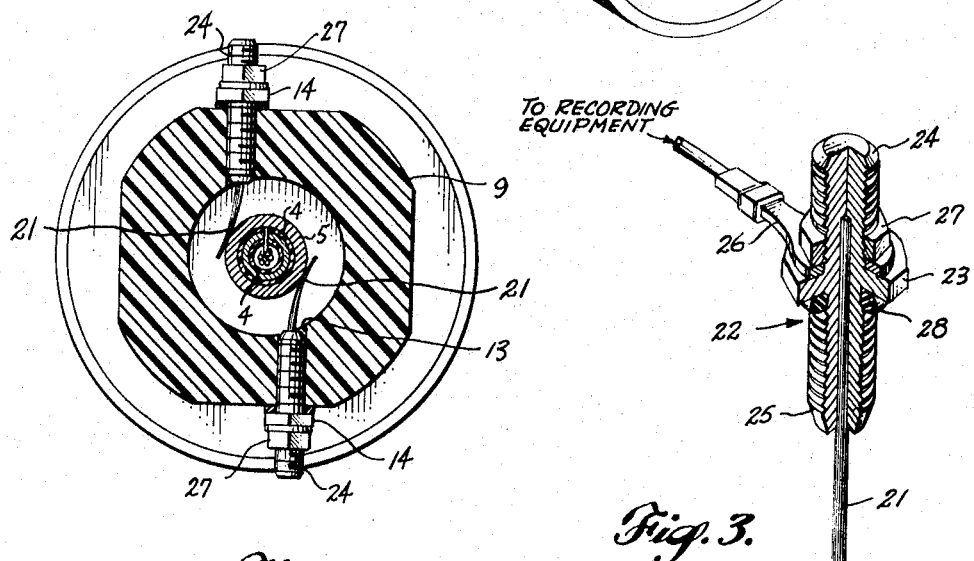
Fig. 2.
Fig. 3.
INVENTOR.
FRANK F. MAYTONE
BY L. E. Carnahan
AGENT

United States Patent Office 3,316,519
Patented Apr. 25, 1967

3,316,519
WATER COOLED AND LUBRICATED ELECTRICAL SLIP RINGS
Frank F. Maytone, Federal Way, Wash., assignor to The Boeing Company, Seattle, Wash., a corporation of Delaware
Filed Nov. 12, 1963, Ser. No. 323,019
4 Claims. (Cl. 339—5)

This invention relates to electrical slip rings and more particularly to liquid cooled and lubricated electrical slip rings for use in very high speed, and very low electrical noise applications, where moderate life of the slip rings and brushes is required.

For rotary data transmission purposes, the gas-turbine industry, for example, has used slip-ring systems for strain and temperature gage instrumentation read-out from very high-speed gas-turbine rotors. Previous slip-ring assemblies for this application have been troublesome, expensive, and short-lived, largely because of lubrication, brush bounce, and cooling difficulties due to the high rotational speed. Silver-graphite brush material has become the standard in conventional slip-ring assemblies for gas turbine instrumentation, since it provides dry lubrication to partially resist excessive heating and wear resulting from the high speeds. The silver-graphite brushes do wear down, however, and it is common practice to blow the resulting silver-graphite dust out of the slip-ring unit with air to prevent the dust from short circuiting the rings and brushes. The air also serves to cool the unit to a degree.

Separate brush springs are commonly used to develop the required brush pressure, since silver-graphite is a brittle material and cannot act as its own spring. Because of requirements for mounting and guiding silver-graphite brushes and because of the appreciable wear rate of such brushes, the brushes have considerable weight, which results in a low force-to-mass ratio in the spring-brush system. The low force-to-mass ratio in turn results in low compliance of the brush system to ring roughness and eccentricity or runout (low brush system resonant frequency). The requirement for maintaining uniform brush-to-ring contact pressure to achieve low electrical noise demands initial and continued support of fine ring surface finishes and very low limits on slip ring runout with resulting high manufacturing and maintenance costs. The relatively high mass and inertia of the silver-graphite brushes combined with unavoidable ring runout also causes high dynamic peak brush pressures with inevitable heating and high brush and ring-wear rates.

With dry slip rings, microscopic high spots on the rings and brushes probably experience very high local temperatures due to the high frictional power being dissipated at this interface. These two factors result in electrical resistance change and accompanying signal distortion as well as increased wear rates.

Conventional slip ring assemblies for gas turbine rotor instrumentation are frequently designed with remote-controlled actuators which are used to lift the brushes out of contact with the rings to reduce wear except when it is desired to take a set of readings. This procedure adds cost and complexity, reduces reliability and limits the quantity of data obtained.

The current invention provides a direct brush-to-ring interface liquid lubrication and cooling slip ring concept which provides solutions to many of the limitations and disadvantages inherent with dry metal-to-metal slip rings.

Therefore, it is an object of this invention to provide electrical slip rings for high-speed applications.

It is a further object of the invention to provide liquid-cooled and lubricated electrical slip rings.

It is a still further object of the invention to provide liquid-cooled and lubricated electrical slip rings for use in very high-speed, low electrical noise applications.

Another object of the invention is to provide a slip-ring concept having direct brush-to-ring interface liquid lubrication and cooling which overcomes the inherent limitations and disadvantages of the conventional dry metal-to-metal slip rings.

Another object of the invention is to provide liquid cooled and lubricated electrical slip rings utilizing light spring-wire brushes.

Another object of the invention is to provide liquid-cooled and lubricated electrical slip rings utilizing brushes having many fine spring wires in parallel in the form of a tuft.

Other objects of the invention not specifically set forth above will become readily apparent from the following description and drawings in which:

FIGURE 1 is a partial cross sectional view of the invention;
FIGURE 2 is a cross sectional view of the invention taken on the line 2—2 of FIGURE 1; and
FIGURE 3 is an enlarged view of a brush of the FIGURE 1 device showing the external connection.

In accordance with the invention, the presence of a lubricating liquid at the ring-brush interface makes the use of silver-graphite material with its dry lubricating qualities unnecessary, thus opening a large number of brush materials and configurations for consideration, including metal-alloy wires in spring temper. The functions of brush contact and brush spring can therefore be combined in one simple piece of spring wire having a force-to-mass ratio orders-of-magnitude greater, and a total mass orders-of-magnitude lower than is possible with a silver-graphite brush and its separate spring system. The light spring-wire brush of the invention is able to remain in good electrical contact with a ring having considerable roughness and eccentricity at much higher speeds than the more massive silver-graphite brush. Likewise, a light wire brush, because of its low inertia, develops much lower peak pressures against the ring high spots than do the heavier silver-graphite brushes. Required brush pressure can then be furnished by the inherent spring characteristics of the wire.

In accordance with the invention, advantages over the single wire type brush may be gained by utilizing many fine spring wires in parallel in the form of a tuft. This allows many wires to make contact with the ring simultaneously, providing redundant electrical paths and reducing the electrical noise to very low levels even at high speeds and in the presence of moderate vibration, ring roughness, and runout. Additional redundancy is obtained by using several tuft-brush assemblies per ring.

In addition to providing their own low-inertia spring pressure and multiple electrical contact points, the many fine wires of the tuft brushes provide mutual vibration damping to each other by virtue of the friction between the wires of the tuft. This damping further increases slip ring unit tolerance of ring roughness, runout, and engine vibration.

The fine-wire-tuft brush configuration has further advantages applicable to the liquid-cooled and lubricated slip ring unit of the invention. The plurality of fine wires permits flow of the liquid among the wires providing more intimate cooling and more effective lubrication than could occur if the brushes were of conventional construction with appreciable area of impervious material at the contact surface. Also, the small contact area of each brush-tuft strand reduces or prevents hydrodynamic lifting of the brushes from the ring surface at high speeds.

The choice of a lubricating and cooling liquid for the slip rings involves several considerations. For very high speeds it was found that the viscosity of the cooling liquid used must be low to prevent hydrodynamic lifting of the brush strands. Water is an ideal liquid for lubrication and cooling of all medium and low impedance slip ring circuits, such as turbine rotor strain-gage and temperature-gage circuits. Water is readily available, harmless to the turbine, gives long life, low electrical noise slip ring performance, and negligible cross talk. For higher-impedance circuits, cross coupling through the water between adjacent rings and brushes may dictate that distilled or distilled and deionized water be used. For very high-impedance or high-voltage circuits, TF Freon ($C_2Cl_3F_3$) or ethylene trichloride ($C_2HCl_3$) are excellent slip-ring cooling and lubricating liquids. Water should also be avoided where the voltage between rings or from ring to ground would cause electrolysis.

It is not known at this time whether the brushes on water-cooled units are separated from the rings by a microscopically-thin and electrically-conductive film of liquid during high-speed operation, or whether actual metal-to-metal contact occurs, but the practical result of using a liquid at the brush-ring interface is stable, long-life operation with low friction and low electrical noise. If metal-to-metal contact occurs, it is theorized that it occurs only on a few high spots at any instant, and that these high spots are intimately cooled and lubricated by the liquid preventing hot spots, galling, welding, and excessive friction, while minimizing electrical noise and wear. Contact cleanliness resulting from the continuous washing or scrubbing action on the interface surfaces by the liquid may also be a major factor in keeping the electrical noise low.

The rings should be of a material that will not readily form resistive films or tend to weld to the brush. Hard gold-alloy rings fulfill the non-oxidizing requirement and tend to be burnished smooth by the brushes rather than gall. The brush material must be compatible with the ring material. Spring brass adequately satisfies the requirements for brush material to be used with gold rings.

Miniaturization of slip-ring assemblies for high-speed operation is important in order to reduce the slip velocity at the ring-brush interface, thus increasing brush and ring life. With liquid-lubricated slip rings, reducing slip velocity by minimizing ring diameter offers the further advantages of reducing the hydraulic brush-lifting action and reducing the tendency for the liquid to cavitate away from the rings. The liquid cooling permits slip rings for handling power to be much smaller than dry slip rings to carry the same current.

Referring now to the drawings which show one embodiment of the invention, the slip-ring assembly consists of a hollow corrosion-resistant steel shaft 1 having grooves 2 with holes therein to provide for the installation of ring lead wires 3 which are shown extending into hollow shaft 1 from their associated sensors (or gages). Shaft 1 is coated inside and outside with thin layers of epoxy insulating resin 4. Eight hard gold-alloy slip rings 5 are positioned on shaft 1, rings 5 being separated by layers of epoxy insulating resin 6. A lead wire 3 is soldered to each ring 5. Corrosion-resistant stainless steel ball bearings 7 and 8 support shaft 1. The seals (not shown) of each bearing 7 and 8 are removed prior to installation and the original lubrication is removed with solvents and ultrasonic cleaning. The seals are then replaced. This is done because it is essential that the grease be completely removed to insure that it does not deposit on the slip ring and brush surfaces, where it would produce electrical contact noise. The shaft 1 is preferably attached to a drive shaft from the associated equipment (not shown) by a flexible nylon tube coupling with bi-directional flexure pivots at each end (not shown) to allow for radial and angular misalignment between the driving shaft and the slip ring assembly shaft 1. The lead wires 3 are preferably insulated solid-copper magnet wire and are supported in the center of the coupling by plastic sleeving (not shown) to eliminate any possible fatigue of the wire leads in the flexible coupling between the driving shaft and hollow slip ring assembly shaft 1.

A casing 9 of electrical insulating material surrounds the slip rings 5 and provides support for the outer bearing races of ring-shaft bearings 7 and 8. Casing 9 includes a chamber portion 10, annular grooves 11 and 12, and threaded apertures 13 within which tuft-brush units 14 are threaded attached, there being 16 brushes in this embodiment (two per ring). Casing 9 is also provided with inlet and outlet passageways (not shown) which interconnect with annular grooves 11 and 12 and to which are attached cooling and lubricating fluid inlet and exhaust tubes 15 and 16, respectively.

As shown in FIGURE 1, a pair of shock mounts 17 and 18 of soft synthetic elastomer, such as rubber or soft plastic, are positioned around the ends of casing 9 to support the assembly and reduce vibration transmitted from the equipment being tested to the slip ring casing. The shock mounts 17 and 18 also compensate for some radial and axial misalignment between slip ring shaft 1 and the driving shaft (not shown).

Steel rings 19 and 20 are mounted around shock mounts 17 and 18, respectively, to permit rigid clamping of the slip ring assembly for test applications, thus readily allowing controlled positioning of the slip ring assembly upon application installation.

As shown in FIGURES 1 and 2, a pair of tuft-brush units 14 are operatively positioned with respect to each ring 5 and at 180° with respect to one another so that if one brush unit should break contact due to slip ring eccentricity or vibration, the opposite brush unit is still in contact. In the embodiment shown, eight (8) slip rings 5 are utilized, thus sixteen (16) tuft-brush units 14 are utilized, there being four (4) rows of four brush units, one row mounted every 90° around casing 9. As shown in FIGURE 3, tuft-brush units 14 each contain a plurality of small diameter spring temper (resilient) brass wires 21 which are soft soldered into a hollow brass body 22. Body portion 22 includes a central flange 23 and threaded end portions 24 and 25. A brass connection 26 is held against flange 23 by a brass nut 27 threaded on end portion 24 of the brush body 22, said connection 26 being operatively connected with recording equipment as indicated by legend. A rubber O-ring 28 abuts against the lower surface of flange 23 and serves as a seal when the tuft-brush unit 14 is threaded into casing 9, thus preventing leakage of the cooling and lubricating fluid from chamber 10. The operating length and amount of deflection of the brush-tuft wires is pre-determined by the position of the brush mounting apertures 13 in casing 9. As shown in FIGURE 2, the brush-tuft wires 21 are slightly deflected and the ends of the wire extend beyond the surface of the associated ring 5 to prevent the ends from engaging and damaging the ring should the slip-ring assembly be rotated in a direction reverse of the normal movement.

As set forth above, water as the cooling and lubricating liquid is preferred except under certain operating conditions wherein selected insulating liquids such as ethylene trichloride or TF Freon would be utilized. Water or other liquid can be supplied to chamber 10 through inlet tube 15 and annular groove 11 by a simple gravity feed, no return setup, or by connecting tube 15 directly to a water supply tap, or by any other desirable supply setup. The flow rate of water through the slip ring assembly can be controlled by utilizing an adjustable tubing squeeze clamp (not shown). It is preferred that the flow rate control device be in exhaust tube 16 rather than in inlet tube 15 to prevent syphoning action from water in the exhaust tube pulling air into the rings through bearings 7 and 8. Positioning of the flow-control device in the exhaust tube 16 also serves to increase the internal water pressure of the assembly, thereby reducing the tendency toward cavitation. Tests have shown that with a flow rate of one gallon of water per hour through an eight ring unit running at 50,000 r.p.m., the outlet water temperature was about 25° F. warmer than the entering water temperature, thus clearly indicating the cooling action of the invention.

Tests have shown that the cooling and lubricating liquid may also be dropped on, squirted or sprayed at or wicked to the operating brush-ring interfaces instead of flooding the slip ring case with liquid. These later methods might be preferable to flooding the case in low torque applications where the hydrodynamic shear power losses might be excessive in a flooded case. Separate liquid supply to each ring could also be advantageous in certain critical cross-talk or electrolysis situations.

It has thus been shown that the water-lubricated and cooled slip ring assembly of the invention combines the features of low cost, small size ultra-high speed operation, large number of data channels, simplicity, and sufficient flexibility to adapt it to most rotary data transmission or other rotating-contact power or signal conduct power or signal conducting applications. This advance in slip ring assemblies is the result of the new concept of the introduction of water or other suitable liquid ino direct contact with the brushes and rings for cooling, cleaning and lubricating of the brush-slip ring interface, and the new and superior brush configuration made possible by the use of the cooling and lubricating liquid.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim is:
1. A slip ring assembly, comprising:
 (a) a housing defining a chamber, liquid water contained in said chamber,
 (b) a shaft mounted for rotation in said chamber,
 (c) at least one slip ring mounted to said shaft for rotation therewith,
 (d) at least one brush mounted in said chamber so as to be in contact with said slip ring,
 (e) said brush and said slip ring being immersed in said water in said chamber so as to be lubricated and cooled thereby.

2. The apparatus as recited in claim 1, wherein there is a plurality of slip rings and a plurality of brushes associated therewith immersed in said water.

3. The apparatus as recited in claim 1, wherein there is means for circulating water through said chamber, said means including an inlet to direct water into said chamber, and an outlet to carry water from said chamber.

4. The apparatus as recited in claim 1, wherein said brush comprises a group of electrically conductive, resilient wires arranged in contact with said slip ring.

References Cited by the Examiner
UNITED STATES PATENTS

| | | | |
|---|---|---|---|
| 1,925,856 | 9/1933 | Vaughan | 339—278 X |
| 2,111,117 | 3/1938 | Lake | 339—150 X |
| 2,248,394 | 7/1941 | Sorensen | 339—5 |
| 2,269,614 | 1/1942 | Von Soden | 310—228 |
| 2,446,548 | 8/1948 | Nachtman | 339—5 X |
| 2,575,409 | 11/1951 | Cooper et al. | 339—5 |
| 2,699,597 | 1/1955 | Arms | 339—258 X |
| 2,703,372 | 3/1955 | Savage | 310—228 |
| 2,708,740 | 5/1955 | Toarmina | 339—49 X |
| 2,773,247 | 12/1956 | Erhardt | 339—5 |
| 2,805,350 | 9/1957 | Parriss et al. | 310—228 |
| 2,854,647 | 9/1958 | Nugent | 339—5 |
| 2,979,685 | 4/1961 | Filipczak | 339—5 |
| 3,105,728 | 10/1963 | Seeloff | 339—5 |
| 3,112,970 | 12/1963 | Burns et al. | 339—5 |

OTHER REFERENCES

Savage, R. H., Tele-Tech, May 1950, page 27.

EDWARD C. ALLEN, *Primary Examiner.*

ALFRED S. TRASK, *Examiner.*